(12) United States Patent
Gandel et al.

(10) Patent No.: US 8,860,282 B2
(45) Date of Patent: Oct. 14, 2014

(54) TWO-OR THREE-PHASE POLYPHASE MOTOR WITH R PAIRS OF POLES AND A STATOR WITH S TRAPEZIODAL SHAPED POLES

(75) Inventors: Pierre Gandel, Montfaucon (FR); Daniel Prudham, Thise (FR)

(73) Assignee: Moving Magnet Technologies, Besancon (FR)

( * ) Notice: Subject to any disclaimer, the term of this patent is extended or adjusted under 35 U.S.C. 154(b) by 1255 days.

(21) Appl. No.: 10/489,854

(22) PCT Filed: Sep. 25, 2002

(86) PCT No.: PCT/FR02/03271
§ 371 (c)(1),
(2), (4) Date: Sep. 7, 2004

(87) PCT Pub. No.: WO03/028193
PCT Pub. Date: Apr. 3, 2003

(65) Prior Publication Data
US 2005/0001509 A1   Jan. 6, 2005

(30) Foreign Application Priority Data
Sep. 25, 2001   (FR) ..................... 01 12332

(51) Int. Cl.
*H02K 1/22* (2006.01)
*H02K 21/12* (2006.01)
*H02K 1/06* (2006.01)
*H02K 37/12* (2006.01)

(52) U.S. Cl.
CPC .................. *H02K 37/125* (2013.01)

USPC ................ 310/268; 310/156.32; 310/216.074

(58) Field of Classification Search
USPC ............... 310/156.32–156.37, 268, 216.068, 310/216.074
See application file for complete search history.

(56) References Cited

U.S. PATENT DOCUMENTS

| | | | | |
|---|---|---|---|---|
| 3,597,644 | A | * | 8/1971 | Preece ................... 310/40 R |
| 4,187,441 | A | * | 2/1980 | Oney ...................... 310/112 |

(Continued)

FOREIGN PATENT DOCUMENTS

| | | | |
|---|---|---|---|
| EP | 0990961 | 4/2000 | ............ H02K 1/27 |
| FR | 2742940 | 6/1997 | ............ H02K 37/16 |

(Continued)

OTHER PUBLICATIONS

Hendershot, "Design of Brushless Permanent-Magnet Motors", Jan. 1994, 3-1, 3-3 to 3-13, Clarendon Press.*

(Continued)

*Primary Examiner* — Quyen Leung
*Assistant Examiner* — Thomas Truong
(74) *Attorney, Agent, or Firm* — Oblon, Spivak, McClelland, Maier & Neustadt, L.L.P.

(57) ABSTRACT

The invention concerns a polyphase motor comprising M phases, M being equal to 2 or 3, the motor consisting of a stator part (1) excited by electric coils and by a magnetized rotor (2). The invention is characterized in that the rotor (2) has a disc-shaped magnetized part with R pairs of alternately poles magnetized in alternating directions in the thickness, R being equal to n*(M+1) or 5*n, and said stator part (1) has S poles, some of which excited at least by an electric coil, S being equal to 8*n, for even M, and 9*n for odd M, n being an integer not less than 1.

9 Claims, 9 Drawing Sheets

(56) References Cited

U.S. PATENT DOCUMENTS

| | | | | |
|---|---|---|---|---|
| 4,207,483 A | | 6/1980 | Baer | 310/49 R |
| 4,626,727 A | * | 12/1986 | Janson | 310/156.32 |
| 5,168,187 A | * | 12/1992 | Baer et al. | 310/49 R |
| 5,179,307 A | * | 1/1993 | Porter | 310/68 B |
| 5,208,503 A | * | 5/1993 | Hisey | 310/259 |
| 5,218,251 A | | 6/1993 | Allwine, Jr. et al. | 310/49 R |
| 5,397,953 A | * | 3/1995 | Cho | 310/254 |
| 5,731,649 A | * | 3/1998 | Caamano | 310/216 |
| 5,880,551 A | * | 3/1999 | Prudham | 310/254 |
| 6,034,460 A | * | 3/2000 | Tajima et al. | 310/179 |
| 6,043,574 A | * | 3/2000 | Prudham | 310/49 R |
| 6,132,186 A | * | 10/2000 | Cooper et al. | 417/423.7 |
| 6,198,182 B1 | | 3/2001 | Bustamante et al. | 310/49 R |
| 6,664,692 B1 | * | 12/2003 | Kristoffersen | 310/179 |
| 6,776,590 B2 | * | 8/2004 | Cooper et al. | 417/423.7 |
| 2005/0001509 A1 | * | 1/2005 | Gandel et al. | 310/268 |

FOREIGN PATENT DOCUMENTS

| | | | | |
|---|---|---|---|---|
| FR | 2754953 | | 4/1998 | H02K 37/16 |
| JP | 60-091851 | * | 5/1985 | H02K 21/24 |
| JP | 10164779 | * | 6/1998 | H02K 29/00 |
| JP | 2001037107 | * | 2/2001 | H02K 21/24 |
| JP | 2001054270 | * | 2/2001 | H02K 21/24 |

OTHER PUBLICATIONS

Jp 60-091851, "magnet rotary type motor", takahashi et al., May 23, 1985.*

* cited by examiner

Figure 11

TWO-OR THREE-PHASE POLYPHASE MOTOR WITH R PAIRS OF POLES AND A STATOR WITH S TRAPEZIODAL SHAPED POLES

BACKGROUND OF THE INVENTION

1. Field of the Invention

The present invention relates to the art of polyphase electric motors having a multipole cylindrical magnet.

2. Description of the Related Art

These two-phase or three-phase motors have the feature of a structure that is heteropolar on the rotor (annular or disk-shaped magnets having N pairs of poles) and heteropolar on the stator, with P teeth. N and P are chosen in such a way as to minimize the zero-current torque.

In particular, from the prior art there is known French Patent FR2742940, which describes a two-phase motor, especially a clockwork motor or a motor for driving a pointer of a display device. That patent describes a polyphase motor formed by a stator part excited by electric coils and by a magnetized rotor having N pairs of poles magnetized radially in alternate directions, N being equal to 3 or 5. The stator part has at least two W-shaped circuits, each containing an electric coil surrounding the central leg. The W-shaped circuits are disposed in such a way that, when one of the central legs is located opposite a magnetic transition, the other central leg is located opposite a magnetic pole, the pole shoes of the legs of a W-shaped circuit being spaced at angles of $\pi/4$ and the pole shoes of the central legs of two W-shaped circuits belonging to different phases being spaced at angles substantially equal to $\pi/2 \pm k.\pi/N$, where N is the number of pairs of magnetic poles, or in other words 3 or 5, and k is equal to 0, 1 or 2.

French Patent FR2754953 describes a polyphase motor comprising a stator part excited by electric coils and a magnetized rotor having N pairs of poles magnetized radially in alternate direction, N being equal to 4 or 5. The stator part has at least two W-shaped circuits, each containing an electric coil surrounding the central leg. The W-shaped circuits are disposed in such a way that, when one of the central legs is located opposite a magnetic transition, the other central leg is located opposite a magnetic pole. The pole shoes of the central legs of two W-shaped circuits belonging to different phases are disposed at an angular spacing substantially equal to 120°.

The problem posed by the prior art motors is that of space requirement along the axis of rotation of the motor because of the use of cylindrical magnets, and that of the quality of the cylindrical magnets having radial anisotropy, which at equal energy cost three times more than disk-shaped magnets having axial anisotropy.

SUMMARY OF THE INVENTION

The object of the present invention is to propose a motor that has zero torque at zero current, with high performance for reduced space requirement. To this end, the invention relates in its most general sense to a polyphase motor having M phases, where M is equal to 2 or 3, the motor comprising at least one stator part (1) excited by electric coils and a magnetized rotor (2), characterized in that the rotor (2) has a magnetized part in the form of a disk containing R pairs of poles magnetized along the thickness in alternate directions, R being equal to $n*(M+1)$ or $5*n$, and in that at least one of the stator parts (1) has S poles, at least some of which are excited by an electric coil, S being equal to $8*n$ for even M and to $9*n$ for odd M, n being an integral number greater than or equal to 1. Preferably, the rotor has the form of a disk.

According to a first alternative version, the stator is composed of two complementary stator parts, each having S poles disposed on both sides of the magnetized part.

According to a second alternative version, the magnetized part is disposed between the pole parts of the stator and a yoke.

According to a particular embodiment, the magnetized part is integral with the said yoke.

According to a first example of use, the rotor has 3n pairs of poles and at least one of the stator parts has $8*n$ poles, n being an integral number greater than or equal to 1.

According to a second example of use, the rotor has 5n pairs of poles and at least one of the stator parts has $8*n$ poles, n being an integral number greater than or equal to 1.

According to a third example of use, the rotor has 5n pairs of poles and at least one of the stator parts has $9*n$ poles, n being an integral number greater than or equal to 1.

According to a fourth example of use, the rotor has 4n pairs of poles and at least one of the stator parts has $9*n$ poles, n being an integral number greater than or equal to 1.

BRIEF DESCRIPTION OF THE DRAWINGS

The present invention will be better understood by reading the description hereinafter of a non-limitative practical example, with reference to the attached drawings, wherein:

FIG. 10 illustrates an embodiment of the invention where the motor has three phases, the rotor has 4 pole pairs, and the stator has 9 poles; and.

DETAILED DESCRIPTION OF THE PREFERRED EMBODIMENTS

Figure 1:
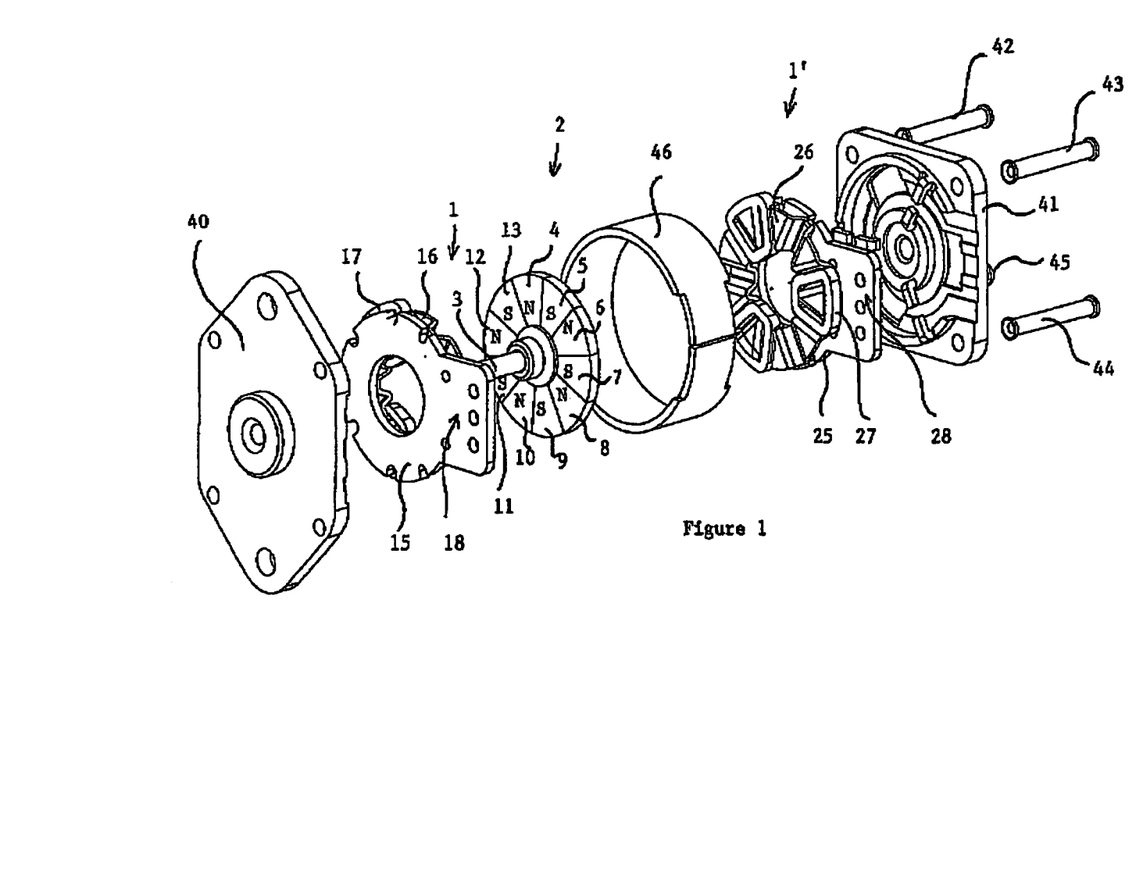
FIG. 1 illustrates an enlarged exploded view of a three-phase motor according to the invention.

FIG. 1 illustrates an exploded view of a three-phase motor according to the invention. It is composed of two stator parts (1, 1') and of a rotor (2). The rotor (2) is supported by a shaft (3).

The rotor has 10 thin magnets (4 to 13), magnetized in axial direction, or in other words along the thickness of the magnet, in alternate manner. Each magnet has the shape of a segment of a disk.

Figure 2:
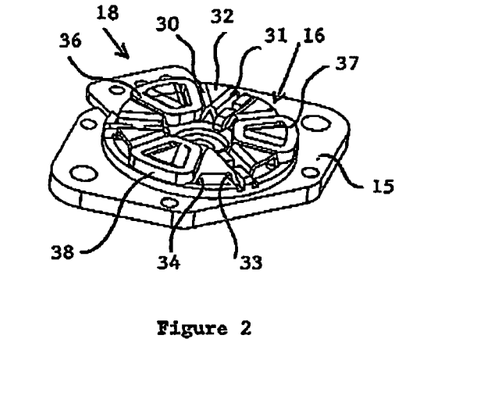
FIGS. 2 and 3 illustrate views of the two stator parts of the motor illustrated in FIG. 1.
Figure 3:
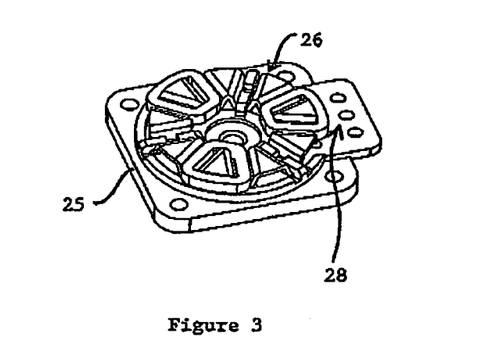

As illustrated in FIGS. 2 and 3, the stator is formed from two complementary stator parts, disposed on both sides of the magnetized part of the rotor. Each stator part is supported by a plate (15, 25) of plastic material forming a fixation flange. The stator part is composed of a serrated ring (16, 26) formed by drawing of a sheet of iron-silicon alloy, in such a way that it has 9 teeth of trapezoidal shape, with side flanks (33, 34) substantially perpendicular to the transverse plane and chamfers (30, 31) formed along upper ridges, on both sides of the upper face (32). Two consecutive teeth are separated by a radial space.

One tooth out of three is surrounded by a coil (17, 27). The three coils (36, 37, 38) of a given stator part are electrically connected via a printed circuit to supply terminals (18, 28) for connection to the three-phase supply source.

A rear flange (40), a front flange (41) and a cylindrical envelope (46) of aluminum form the housing. Rivets (42 to 45) ensure fixation of the assembly.

Figure 4:
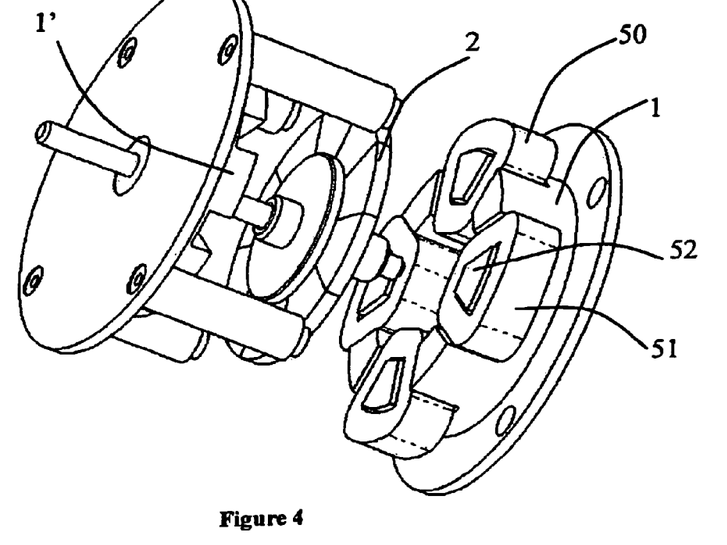
FIG. 4 illustrates a perspective view of a two-phase motor having two stator stages.

FIG. 4 illustrates a two-phase alternative embodiment in which the stator is formed from two stator parts (1, 1') disposed on both sides of a disk-shaped rotor.

One of the stator parts (1) supports exciting coils (50, 51) surrounding teeth (52, 53).

The other stator part (1') has teeth, none of which is surrounded by an electric coil.

Figure 5:
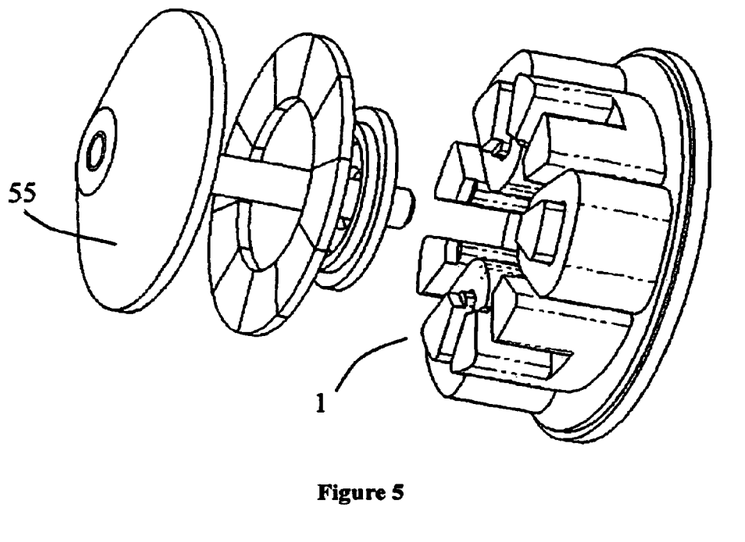
FIG. 5 illustrates a view of a three-phase alternative version having a single stator stage.

FIG. 5 illustrates another three-phase alternative embodiment, in which the stator has a single part (1). The rotor has a disk-shaped magnetized part bonded to a conical yoke (55) that ensures flux closure.

FIGS. 1 and 5 are examples of three-phase motor (M=3) having a disk-shaped rotor magnet with 5 pairs of poles (R=5*n with n=1, that is 5 pairs of alternating South and North magnetic poles) and having a stator with 9 poles (S=9*nm with n=1). As can be seen, there are 3 coils defining the 3 electric phases.

Figure 6:
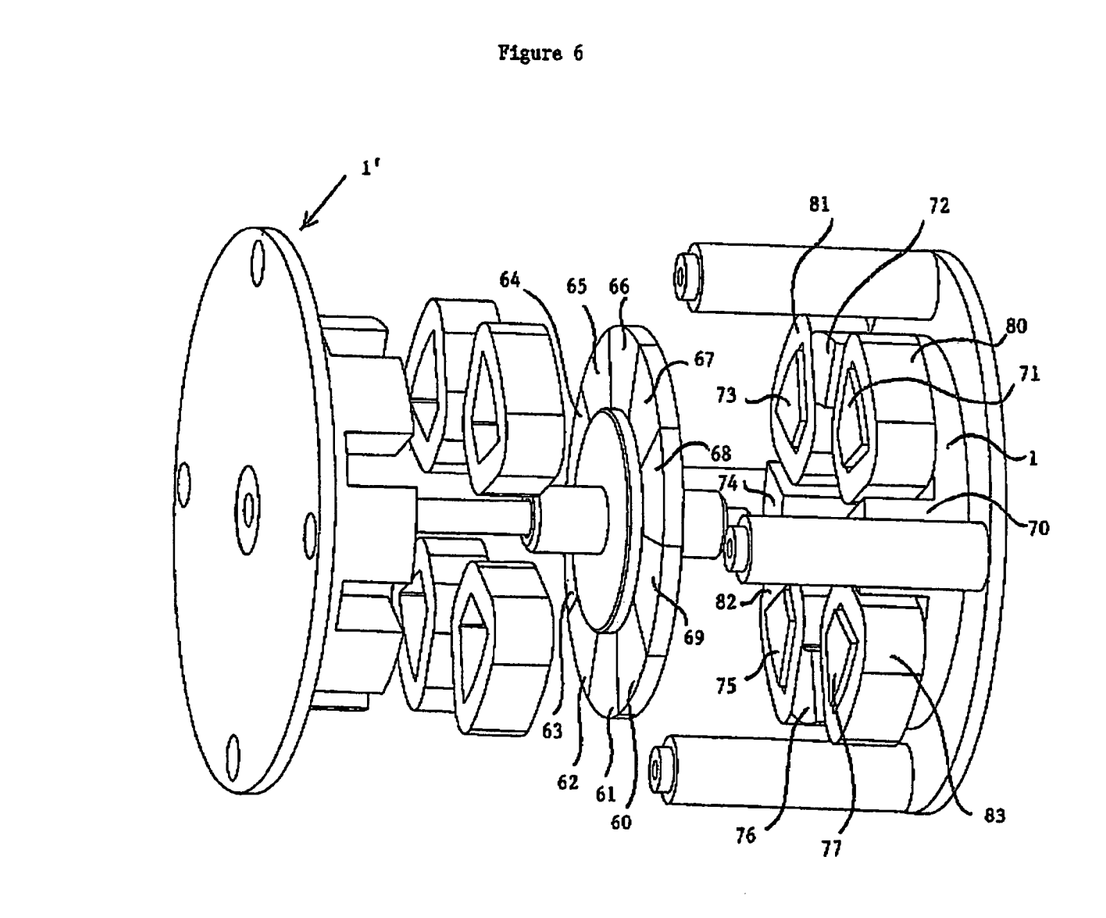
FIG. 6 illustrates an exploded view of a two-phase motor.

FIG. 6 illustrates an alternative embodiment of a two-phase motor.

Rotor (2) is provided with 10 thin magnets (60 to 69) magnetized in alternate directions along the thickness.

The stator part (1) has 8 teeth (70 to 78), wherein every second tooth is surrounded by a coil (80 to 83).

The symmetric part (1') is disposed symmetrically relative to the plane of the magnets (60 to 69). It also has 8 teeth, wherein every second tooth is surrounded by a coil.

FIG. 6. is an example of a two-phase motor (M=2) having a disk shaped rotor magnet with 5 pairs of poles (R=5*n, with n=1) and having a two stator set with 8 poles each (S=8*n, with n=2). Four coils define the 2 electric phases.

Figure 7:
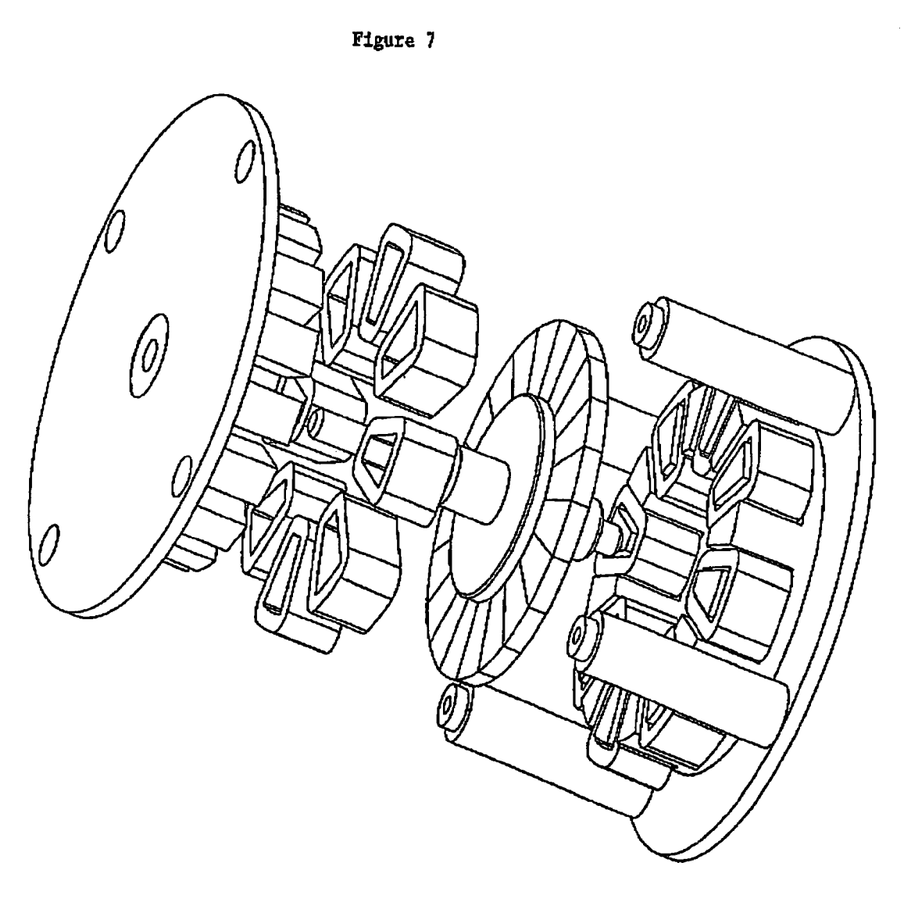
FIG. 7 illustrates an alternative embodiment of a three-phase motor having two stator stages.

FIG. 7 illustrates an alternative embodiment of a motor having 10 pairs of magnetized poles and 32 stator teeth, distributed into two stator parts and excited by 16 coils.

FIG. 7. is an example of a two-phase motor (M=2) having a disk shaped rotor magnet with 10 pairs of poles (R=5*n, with n=2) and having two stators with 16 poles each (S=8*n, with n=2). Four coils define the 2 electric phases.

Figure 8:
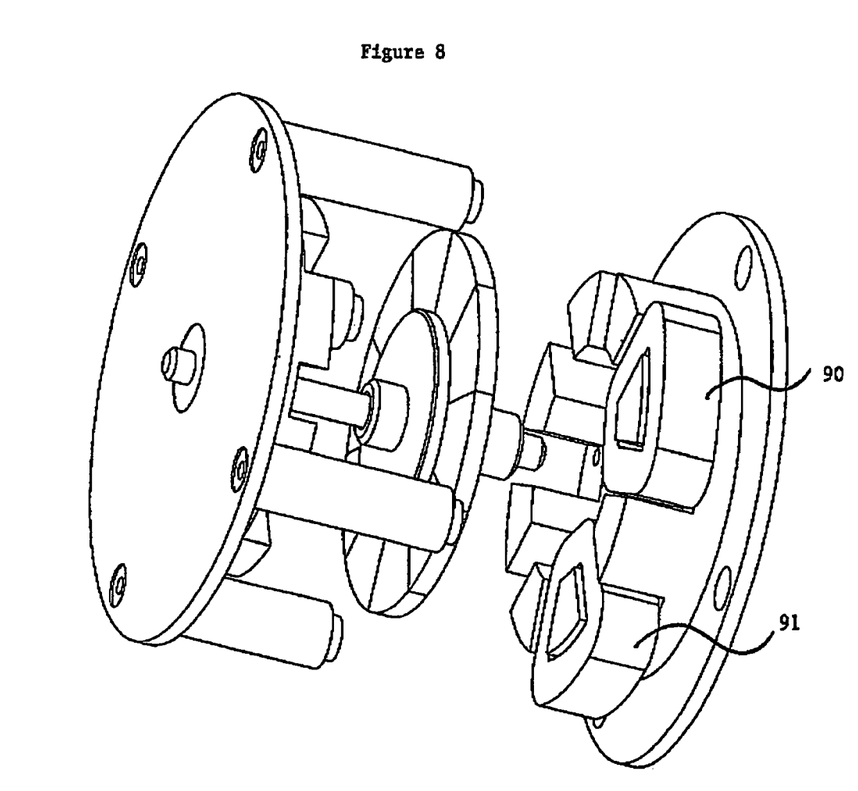
FIG. 8 illustrates another alternative embodiment of a two-phase motor.

FIG. 8 illustrates an alternative embodiment that permits the cost and space requirement of a two-phase motor according to the invention to be reduced, by limiting the number of coils to 2 coils (90, 91) for a two-phase version. The two coils surround two teeth spaced apart by a non-excited tooth.

Figure 9:
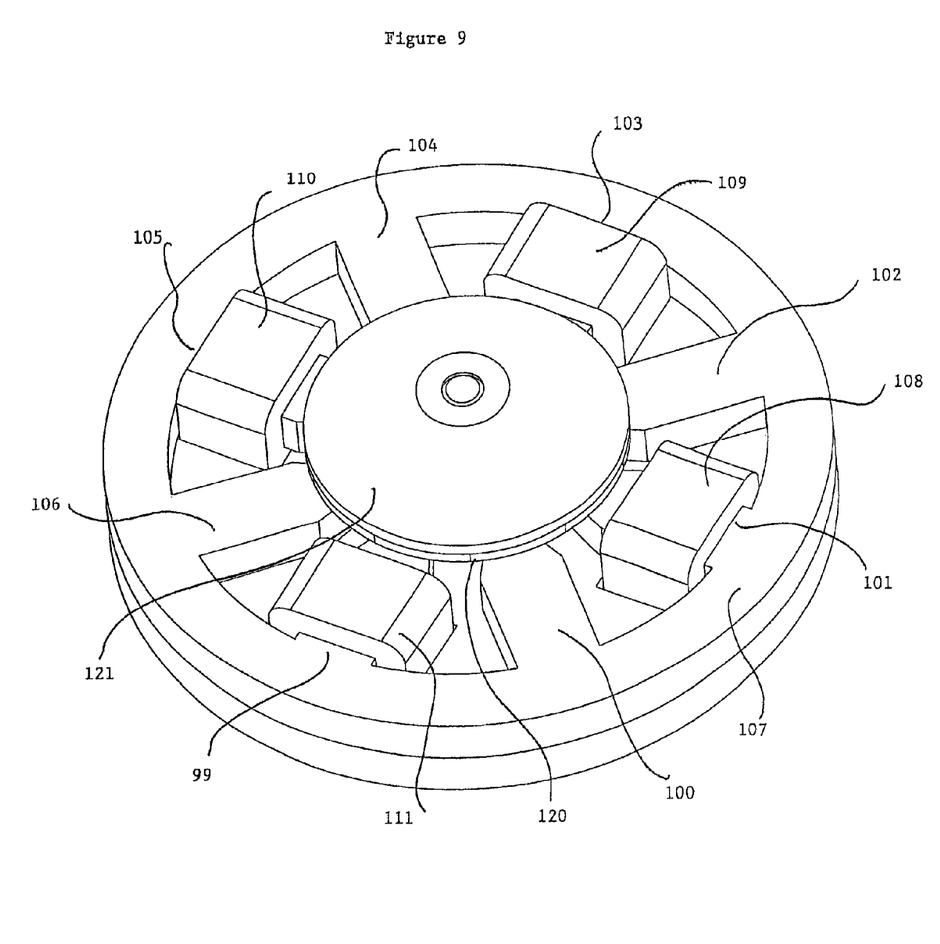
FIG. 9 illustrates a view of an alternative embodiment in which the stator teeth are radial.
Figure 10:
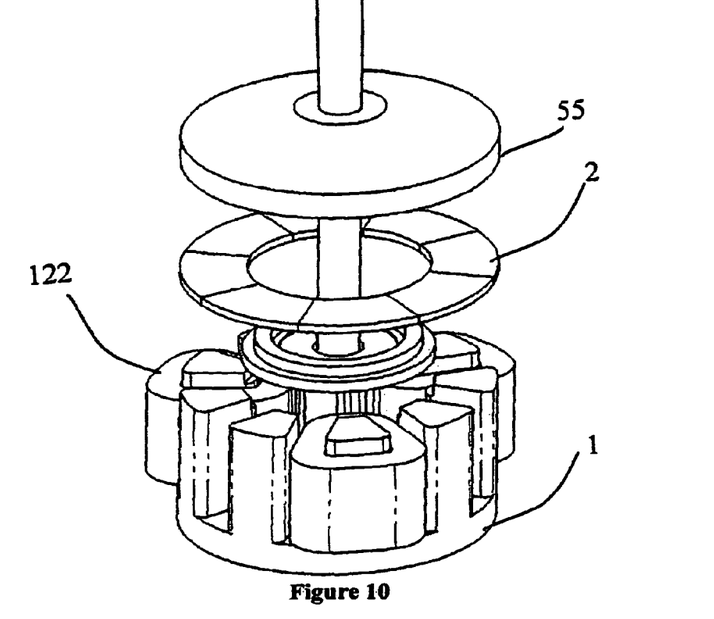
Figure 11:
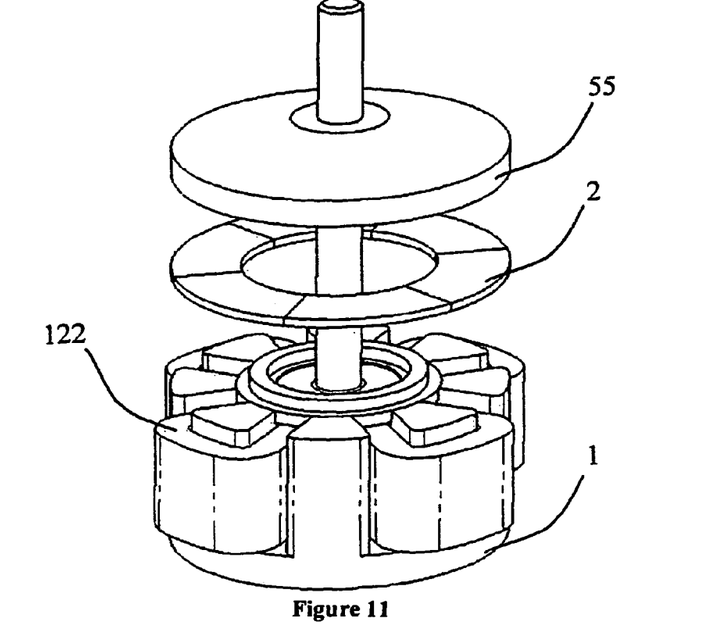
FIG. 11 illustrates an embodiment of the invention where the motor has two phases, the rotor has 3 pole pairs, and the stator has 8 poles.

FIG. 9 illustrates a view of a two-phase alternative embodiment in which the stator teeth (99 to 106) are radial.

They are connected by an annular yoke (107). Every second tooth is surrounded by a coil (108 to 111), the axis of which is radial.

The teeth have the form of radial lugs, the free ends of which have trapezoidal shape and extend under the magnetized disk (120). On its opposite face the magnetized disk (120) has a yoke (121), which ensures flux closure.

FIGS. 4, 8, and 9 are examples of a two-phase motor (M=2) having a disk shaped rotor magnet with 5 pairs of poles (R=5*n, with n=1) and having a stator with 8 poles (S=8*n, with n=1). Four coils define the 2 electric phases.

The invention claimed is:

1. A polyphase motor having M phases, where M is equal to 2 or 3, the motor comprising:
    a rotor including a magnetized part in the form of a disk;
    a pair of complementary stator parts, each stator part is a monolithic part including axial teeth of trapezoidal shape with side flanks substantially perpendicular to the transverse plane of the motor and forming poles, the pair of stator parts configured to be excited by electric coils and the magnetized rotor,
    wherein the rotor has R pairs of poles magnetized along a thickness in alternate directions, R being equal to $n*(M+1)$ or $5*n$, the total number of trapezoidal teeth is S, S being equal to $8*n$ for even M and to $9*n$ for odd M, n being an integral number greater than or equal to 1, and one trapezoidal tooth out of three is wrapped by the electrical coil when M is odd and one trapezoidal tooth out of two is wrapped by the electrical coil when M is even.

2. A two-phase motor according to claim 1, wherein the rotor has 3n pairs of poles and at least one of the stator parts has 8*n poles, n being an integral number greater than or equal to 1.

3. A two-phase motor according to claim 1, wherein the rotor has 5n pairs of poles and at least one of the stator parts has 8*n poles, n being an integral number greater than or equal to 1.

4. A three-phase motor according to claim 1, wherein the rotor has 5n pairs of poles and at least one of the stator parts has 9*n poles, n being an integral number greater than or equal to 1.

5. A three-phase motor according to claim 1, wherein the rotor has 4n pairs of poles and at least one of the stator parts has 9*n poles, n being an integral number greater than or equal to 1.

6. A two-phase motor according to claim 1, wherein the stator parts each include a serrated ring having the axial teeth of trapezoidal shape.

7. A polyphase motor having M phases, where M is equal to 2 or 3, the motor comprising:
    a rotor including a magnetized part in the form of a disk;
    a stator having a monolithic body including axial teeth of trapezoidal shape with side flanks substantially perpendicular to the transverse plane of the motor and forming poles, the stator configured to be excited by electric coils and the magnetized rotor, wherein
    the rotor has R pairs of poles magnetized along a thickness in alternate directions, R being equal to $n*(M+1)$ or $5*n$, the total number of trapezoidal teeth is S, S being equal to $8*n$ for even M and to $9*n$ for odd M, n being an integral number greater than or equal to 1, one trapezoidal tooth out of three is wrapped by the electrical coil when M is odd and one trapezoidal tooth out of two is wrapped by the electrical coil when M is even, and the magnetized part is disposed between the pole part of the stator and a yoke.

8. A polyphase motor according to claim 7, wherein the magnetized part is integral with the yoke.

9. A two-phase motor according to claim 7, wherein the stator includes a serrated ring having the axial teeth of trapezoidal shape.

* * * * *